United States Patent [19]

Iizuka et al.

[11] Patent Number: 5,680,596
[45] Date of Patent: Oct. 21, 1997

[54] DATA TRANSFER APPARATUS WITH AUTOMATIC TRANSMISSION RATE ADJUSTMENT

[75] Inventors: Shinji Iizuka, Yokohama; Mamoru Kajinami, Sagamihara; Tetsuo Kanno, Fujisawa, all of Japan

[73] Assignees: International Business Machines Corporation, Kanagawa-Ken, Japan; Advanced Peripherals Technologies, Inc., Armonk, N.Y.

[21] Appl. No.: 520,825

[22] Filed: Aug. 29, 1995

[30] Foreign Application Priority Data

Aug. 30, 1994 [JP] Japan ................................ 6-205244

[51] Int. Cl.$^6$ ........................................... G06F 3/00
[52] U.S. Cl. ............... 395/559; 395/885; 395/558; 395/556; 395/114; 375/362; 375/359; 375/369; 375/364
[58] Field of Search .......................... 375/356–359, 375/362–364, 369, 373; 395/114, 885, 556–558, 560

[56] References Cited

U.S. PATENT DOCUMENTS

| | | | |
|---|---|---|---|
| 4,577,318 | 3/1986 | Whitacre | 371/1 |
| 4,661,966 | 4/1987 | Schreiner | 375/112 |
| 4,756,007 | 7/1988 | Quresshi | 375/37 |
| 5,371,766 | 12/1994 | Gerbach et al. | 375/119 |
| 5,471,145 | 11/1995 | Mydill | 324/601 |
| 5,504,929 | 4/1996 | Blair et al. | 395/885 |
| 5,515,359 | 5/1996 | Zheng | 370/13 |
| 5,524,184 | 6/1996 | Johnson | 395/114 |

*Primary Examiner*—Christopher B. Shin
*Attorney, Agent, or Firm*—Volpe and Koenig, P.C.

[57] ABSTRACT

A data transfer apparatus includes a computer-side input and output unit for transmitting a data signal which is periodically updated, and a printer-side input and output unit for receiving the data signal transmitted from the computer-side input and output unit and detecting the logic level of the data signal. Particularly, this data transfer apparatus further includes a state transition time measuring circuit, a computer-side CPU, and a printer-side CPU cooperated to transmit a transition test data signal from the computer-side input and output unit in a tuning mode, measure the transition time of the transition test data signal received by the printer-side input and output unit, and adjust transfer parameters which define the transmission rate of the data signal to be transmitted from the computer-side input and output unit and a timing for detecting the logic level of the data signal, on the basis of a result of measurement.

6 Claims, 3 Drawing Sheets

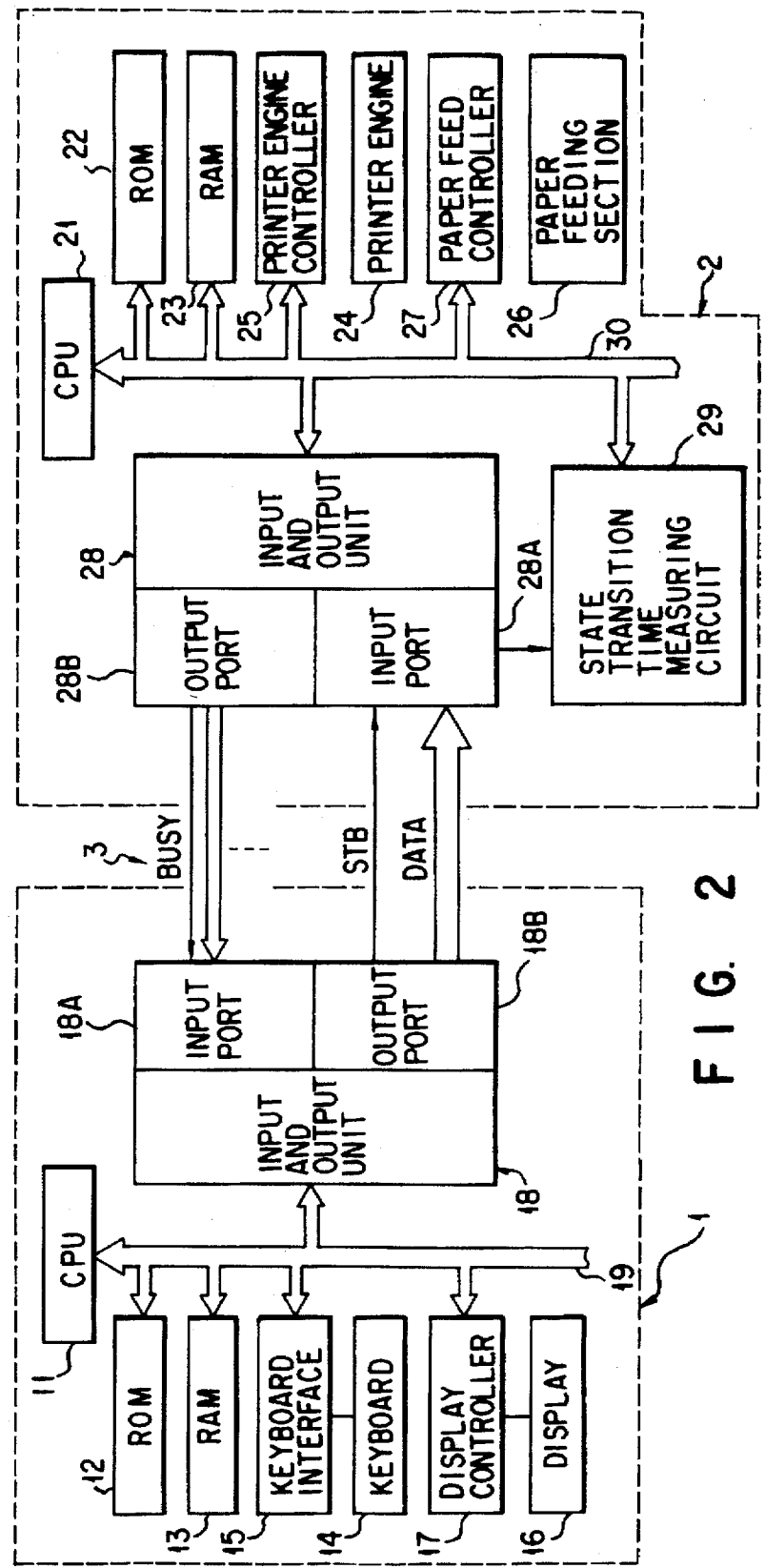

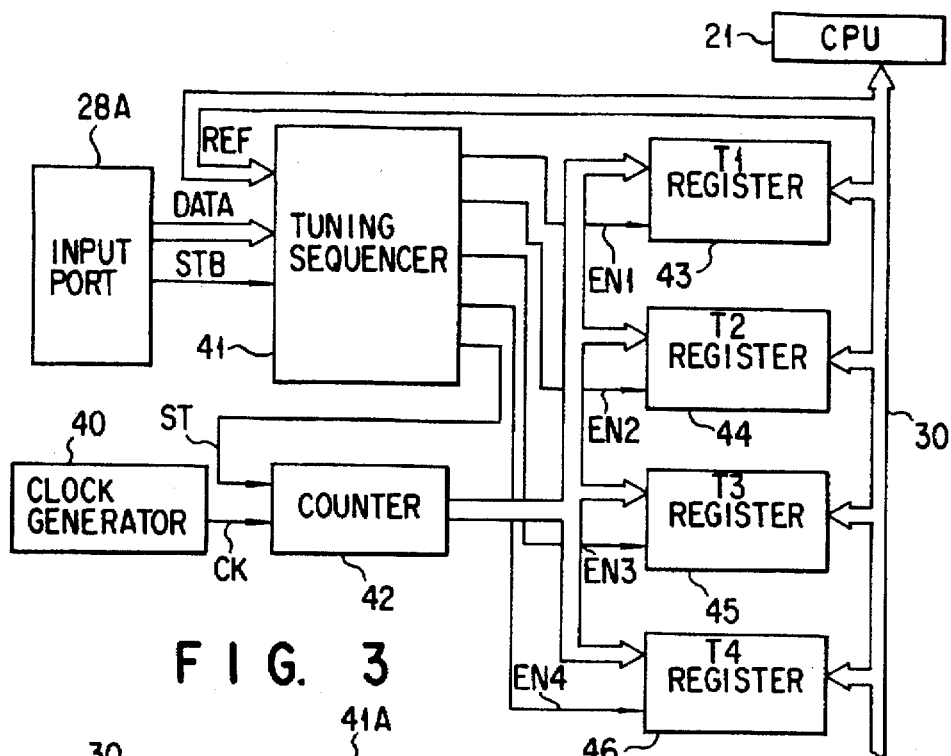
F I G. 3
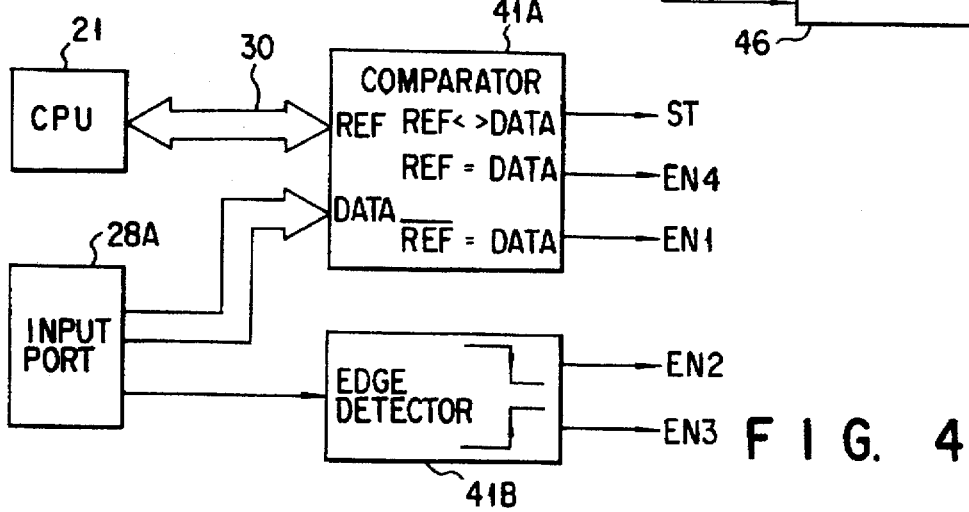
F I G. 4
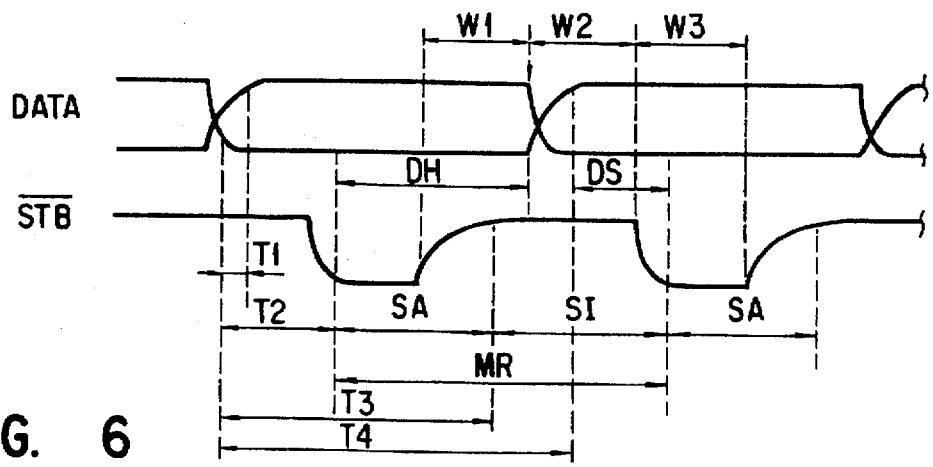
F I G. 6

DATA TRANSFER APPARATUS WITH AUTOMATIC TRANSMISSION RATE ADJUSTMENT

BACKGROUND OF THE INVENTION

1. Field of the Invention

The present invention relates to a data transfer apparatus for performing data transfer between data processing apparatuses such as a computer and a peripheral equipment thereof.

2. Description of the Related Art

A personal computer is generally connected to a peripheral equipment through a cable. When the peripheral equipment receives a signal transmitted from the computer, this received signal is transited with a delay depending on the operational environment including the circuit arrangements of the computer and the peripheral equipment and the length of the cable. This delay is observed as a phenomenon such as dull fall or rise of a received signal S, as shown in FIG. 1. Referring to FIG. 1, t1 and t2 represent fall and rise times of the received signal S, respectively. As the times t1 and t2 become longer, the received signal S is held longer in a threshold range where the logic level ("0" or "1") cannot be determined.

If a printer is connected as the peripheral equipment, a data signal is transmitted from the computer together with a strobe signal synchronized with the data signal. These data and strobe signals are transferred through a data signal line and a strobe signal line, respectively, which are incorporated in the cable. When the printer receives the data and strobe signals, the data signal is latched in response to fall (or rise) of the strobe signal. At this time, the logic level of the data signal is detected.

If the operational environment creates a large difference between the transition time of the strobe signal and that of the data signal, the data signal is latched during transition in the threshold range, which may cause an error in logic level detection. Conventionally, the transmission rate of the data signal is set low to sufficiently delay the timing of logic level detection from an update of the data signal, thereby preventing such a detection error.

However, limitation of the transmission rate largely increases the printing time required to print a large amount of data. Additionally, the transmission rate and the timing of logic level detection are set in advance on the basis of the circuit standards of the personal computer and printer and the standard length of the cable. Therefore, if the actual cable length is larger than the standard length, a detection error may occur since the logic level is detected during transition of the data signal. If the actual cable length is smaller than the standard length, the timing of logic level detection is delayed with respect to completion of transition of the data signal, resulting in waste of time.

SUMMARY OF THE INVENTION

It is an object of the present invention to provide a data transfer apparatus capable of minimizing the data transfer time without causing an erroneous operation in a given operational environment.

In order to achieve the above object, according to the present invention, there is provided a data transfer apparatus comprising a transmission unit for transmitting a data signal which is periodically updated, a reception unit for receiving the data signal transmitted from the transmission unit and detecting a logic level of the data signal, and control means for controlling the transmission unit to transmit a transition test data signal in a tuning mode, measuring a transition time of the transition test data signal received by the reception unit, and adjusting on the basis of a result of measurement transfer parameters which define a transmission rate of data signal to be transmitted from the transmission unit and a logic level detection timing of the data signal.

In this data transfer apparatus, the control means controls the transmission unit to transmit the transition test data signal in the tuning mode, measures the transition time of the transition test data signal received by the reception unit, and adjusts on the basis of a result of measurement transfer parameters which define a transmission rate of the data signal to be transmitted from the transmission unit and a logic level detection timing of the data signal. That is, the transmission rate of the data signal and the logic level detection timing can be optimized in a given operational environment in order to detect the logic level of the data signal immediately after completion of transition thereof without being influenced by the operational environment. Even when the transmission unit and the reception unit are connected through a cable having a length larger than the standard length, a detection error can be prevented since the logic level of the data signal is not detected during transition thereof. Further, even when the transmission unit and the reception unit are connected through a cable having a length smaller than the standard length, waste of time can be prevented since the timing of logic level detection is not delayed with respect to completion of transition of the data signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a view showing a waveform of a received signal transited with a delay;

FIG. 2 is a block diagram schematically showing a computer system according to an embodiment of the present invention;

FIG. 3 is a block diagram showing a state transition time measuring circuit shown in FIG. 2 in more detail;

FIG. 4 is a block diagram for explaining the arrangement of a tuning sequencer shown in FIG. 3;

FIG. 6 is a view showing the waveforms of data and strobe signals received by the input and output unit of a printer shown in FIG. 2.

DETAILED DESCRIPTION OF THE PREFERRED EMBODIMENTS

Figure 5:
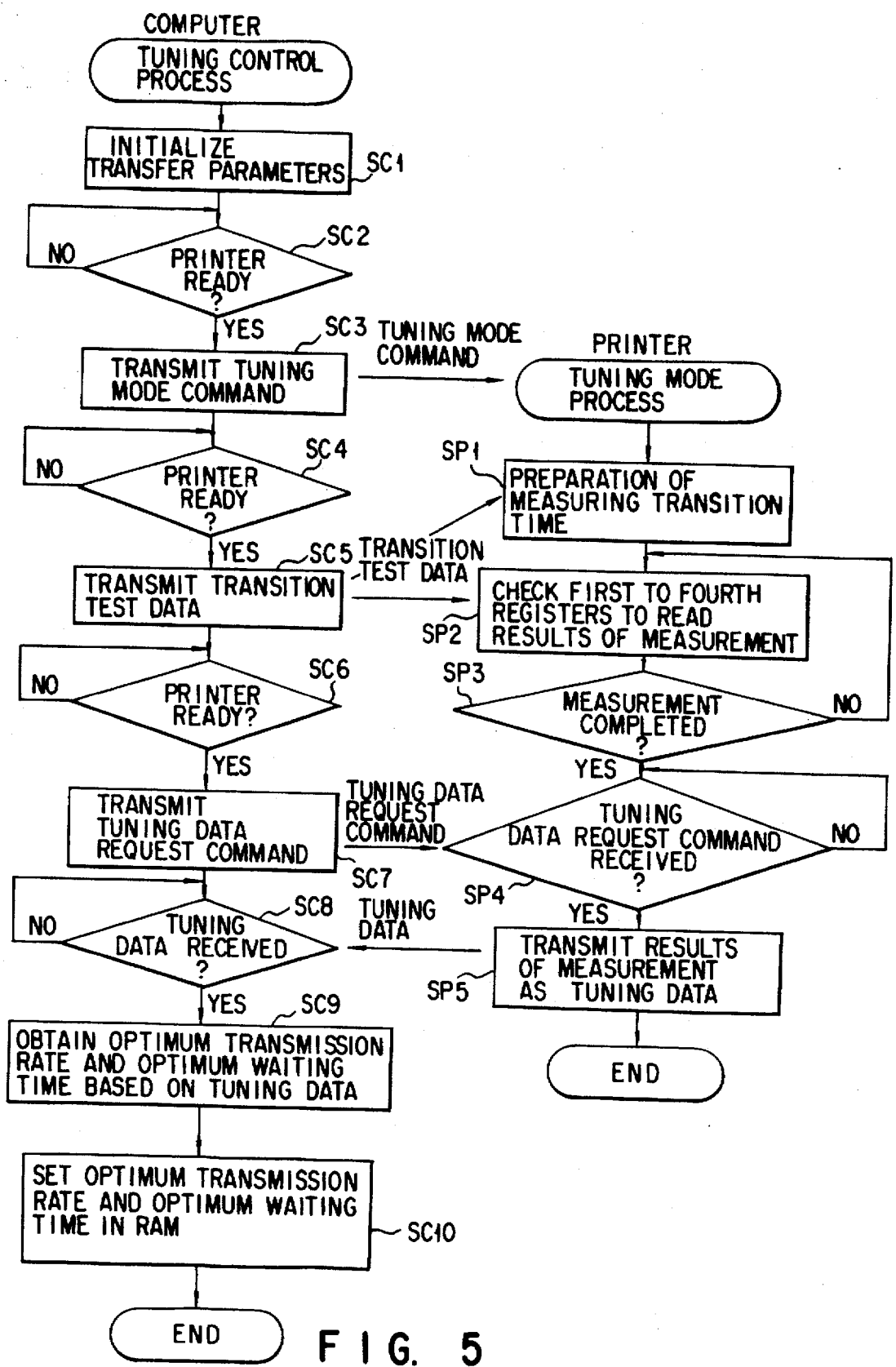
FIG. 5 is a flow chart for explaining the operation of the computer system shown in FIG. 2.

A computer system according to an embodiment of the present invention will be described below with reference to the accompanying drawings.

FIG. 2 is a block diagram schematically showing this computer system. This computer system has a personal computer 1 for performing data processing, and a printer 2 for printing the result of data processing. The personal computer 1 and the printer 2 are connected to each other through a cable 3 to perform data transfer therebetween.

The personal computer 1 includes a CPU 11 for controlling the entire operation of the computer 1, a ROM 12 storing an IPL program, a RAM 13 for storing a tuning program and various data set by the CPU 11, a keyboard 14 for inputting various data and commands, a keyboard interface 15 for interfacing the keyboard 14 to the CPU 11, a display 16 for displaying an image, a display controller 17 for controlling the display 16 according to display data stored in the RAM 13, and an input and output unit 18 for transmitting and receiving various signals through the cable 3. The CPU 11 is connected to the ROM 12, the RAM 13, the keyboard interface 15, the display controller 17, and the input and output unit 18 through a system bus 19. The keyboard interface 15 is connected to the keyboard 14. The display controller 17 is connected to the display 16.

The printer 2 includes a CPU 21 for controlling the entire operation of the printer 2, a ROM 22 storing a print control program, a RAM 23 for storing various data set by the CPU 21, a printer engine 24 for printing an image on paper, a printer engine controller 25 for controlling the printer engine 24 according to printing data stored in the RAM 23, a paper feeding section 26 for feeding paper, a paper feed controller 27 for controlling the paper feeding section 26 to feed paper as the image is printed, an input and output unit 28 for transmitting and receiving various signals through the cable 3, and a state transition time measuring circuit 29 for measuring the transition times of transition test data signals DATA and a strobe signal /STB which are input to the input and output unit 28 through the cable 3. (Note that "/" denotes negative logic.) The CPU 21 is connected to the ROM 22, the RAM 23, the printer engine controller 25, the paper feed controller 27, the input and output unit 28, and the state transition time measuring circuit 29 through a system bus 30. The printer engine controller 25 is connected to the printer engine 24. The paper feed controller 27 is connected to the paper feeding section 26.

On the personal computer 1 side, the input and output unit 18 has an input port 18A connected to the cable 3 to receive signals for use in the personal computer 1, and an output port 18B connected to the cable 3 to output signals for use in the printer 2. The input port 18A includes an input terminal for receiving a busy signal BUSY and four input terminals for receiving tuning data signals or status data signals. The output port 18B includes eight output terminals for outputting the data signals DATA in parallel and an output terminal for outputting the strobe signal /STB. The input and output unit 18 receives the busy signal BUSY, status data signals, and tuning data signals via the input port 18A, and holds them as data having logic levels corresponding thereto. Further, the input and output unit 18 holds printer control data and strobe data each set by the CPU 11, and transmits data signals DATA and a strobe signal /STB corresponding to the logic levels of the data via the output port 18B. Each printer control data is an 8-bit data such as a tuning mode command, transition test data, a tuning data request command, and printing data. The ROM 12 further stores initial transfer parameters which define a transmission rate of data signals DATA and a logic level detection timing of data signals DATA, and are selected in a conventional manner by assuming that the cable 3 is sufficiently larger than the standard length. These transfer parameters include a waiting time W2 for causing the strobe signal /STB to fall after update of the data signals DATA, a waiting time W3 for causing the strobe signal /STB to rise after the fall of the strobe signal /STB, and a waiting time W1 for causing the data signals DATA to update after the rise of the strobe signal /STB, and preset in the RAM 13 before transmitting printer control data. At the time of transmission, the CPU 11 sequentially sets the print control data and strobe data in the input and output unit 18 at timings corresponding to the transfer parameters preset in the RAM 13. Further, the CPU 11 reads data corresponding to each of the busy signal BUSY, the status data signals, and the tuning data signals. The busy signal BUSY and the status data signals are used for determining whether printer control data can be transmitted. The tuning data signals are used for adjusting the transfer parameters stored in the RAM 13 to have optimum values.

On the printer 2 side, the input and output unit 28 has an input port 28A connected to the cable 3 to receive signals for use in the printer 2, and an output port 28B connected to the cable 3 to output signals for use in the computer 1. The input port 28A includes eight input terminals for receiving the data signals DATA in parallel and an input terminal for receiving the strobe signal /STB. The output port 28B includes an output terminal for outputting the busy signal BUSY and eight output terminals for outputting the tuning data signals or status data signals in parallel. The input and output unit 28 receives the data signals DATA and the strobe signal /STB via the input port 28A, and holds printer control data having logic levels corresponding to the data signals DATA. The data signals DATA are latched in response to the fall of the strobe signal /STB. At this time, the logic levels of the data signals DATA are detected. Further, the input and output unit 28 holds busy data and one of status data and tuning data which are set by the CPU 21, and transmits the busy signal BUSY and data signals corresponding to the logic levels of these data via the output port 28B. The ROM 22 further stores initial transfer parameters which are selected in a conventional manner by assuming that the cable 3 is sufficiently larger than the standard length. At the time of transmission, the CPU 21 sequentially sets the status data or tuning data in the input and output unit 28 at timings corresponding to the transfer parameters preset in the ROM 22. The busy data is set in the input and output unit 28 by the CPU 21 when it is in a busy state where subsequent printer control data cannot be processed. Note that the scheme of data transfer between the computer 1 and the printer 2 conforms to the nibble mode of the IEEE 1284 standards in principle.

FIG. 3 shows the state transition time measuring circuit 29 in more detail. The state transition time measuring circuit 29 has a clock generator 40, a tuning sequencer 41, a counter 42, and four 8-bit registers 43 to 46. The tuning sequencer 41 is connected to the input port 28A to receive the data signals DATA corresponding to the transition test data and the strobe signal /STB, and also connected to the CPU 21 through the system bus 30 to receive signals REF corresponding to reference data for transition test. The tuning sequencer 41 holds the reference data signals REF from the CPU 21, detects the transition state of data signals DATA to reference data signals and the transition state of the strobe signal /STB, and generates a start signal ST to be supplied to the counter 42 and latch enable signals EN1 to EN4 to be respectively supplied to the registers 43 to 46. The clock generator 40 generates a reference clock CK at a predetermined frequency, which is supplied to the counter 42. The counter 42 continuously counts the number of reference clocks CK upon reception of the start signal ST. The registers 43 to 46 receive count values supplied from the counter 42, and latch the count values as results of transition time measurement in response to the latch enable signals EN1 to EN4 from the tuning sequencer 41. The CPU 21 reads out the count values T1 to T4 latched by the registers 43 to 46 through the system bus 30, and sequentially supplies the upper four bits and the lower four bits of each count value to the input and output unit 28 as the tuning data.

As shown in FIG. 4, the tuning sequencer 41 has a comparator 41A and an edge detector 41B. The comparator 41A receives the reference data signals REF and the data signals DATA and detects the transition state of the input signal B by comparing the logic levels of the data signals DATA with those of the reference data signals REF. The edge detector 41B receives the strobe signal /STB and detects the transition state of the strobe signal /STB. The reference data signals REF are selected to "01010101", for example. In this case, the transition test data signals DATA are changed in the order of "01010101", "10101010", and "01010101". The start signal ST is generated from the comparator 41A at a timing of detecting that any of the logic levels of data signals DATA is not equal to the that of a corresponding one of the reference data signals REF. The latch enable signal EN1 is generated from the comparator 41A at a timing of detecting that all the logic levels of the data signals are changed to be equal to the inverted logic levels of the reference data signals REF. The latch enable signal EN2 is generated from the edge detector 41B at a timing of detecting that the strobe signal /STB falls below a lower threshold level. The latch enable signal EN3 is generated from the edge detector 41B at a timing of detecting that the strobe signal /STB rises above a upper threshold level. The latch enable signal EN4 is generated from the comparator 41A at a timing of detecting that all the logic levels of the data signals DATA are changed to be equal to those of the reference data signals REF again. Accordingly, the registers 43 to 46 respectively latch the following count values T1 to T4. The count value T1 represents the time from update of the data signals DATA to completion of transition thereof. The count value T2 represents the time from the update of the data signals DATA to completion of fall of the strobe signal /STB. The count value T3 represents the time from the completion of fall of the strobe signal /STB to completion of rise thereof. The count value T4 represents the time from the update of the data signals DATA to the next update thereof.

The operation of the computer system of this embodiment will be described below.

When the personal computer 1 is to drive the printer 2 on the basis of printing data obtained as a result of data processing, the printing data are transferred from the personal computer 1 to the printer 2 through the cable 3. FIG. 5 shows a tuning operation performed prior to data transfer. In this tuning operation, the CPU 11 on the computer 1 side performs a tuning control process by executing the tuning program stored in the RAM 13 while the CPU 21 on the printer 2 side performs a tuning mode process by executing the print control program stored in the ROM 22.

Upon starting tuning control processing, the CPU 11 performs initialization in step SC1. In this initialization, the initial transfer parameters is read from the ROM 12 and stored in the RAM 13. If it is confirmed in step SC2, from the absence of the busy signal BUSY, that the printer 2 is ready, a tuning mode command is transmitted to the printer 2 in step SC3 for preparation of measuring the transition times. After start of preparation, the input and output unit 18 receives the busy signal BUSY. This busy signal BUSY is temporarily interrupted during the preparation. When the interruption is confirmed in step SC4, step SC5 is executed.

In step SC5, the CPU 11 sets transition test data "01010101" in the input and output unit 18 in order to output data signals DATA corresponding to "01010101" to be output therefrom to the signal lines of the cable 3. At this time, the signal lines are set to initial voltage levels. Preparation of measurement is completed by receiving the data signals DATA corresponding to "01010101". Thereafter, the busy signal BUSY is resumed. Responsive to the busy signal BUSY, the CPU 21 sequentially sets transition test data "10101010", strobe data "0", and strobe data "1" in the input and output unit 18. The input and output unit 18 outputs the data signal DATA and strobe signal /STB corresponding to the set values. The strobe signal /STB falls and then rises while the data signals DATA corresponding to "10101010" are maintained. After rise of the strobe signal /STB, the the CPU 21 sets transition test data "01010101" in the input and output unit 18 again. The input and output unit 18 outputs the data signal DATA corresponding to "01010101". The transition times of the data signals DATA and strobe signal /STB are measured while the transition test data is updated from "01010101" to "10101010" and then updated from "10101010" to "01010101" again. During measurement, the busy signal BUSY is continuously received by the input and output unit 18.

When completion of measurement of the transition times is confirmed in step SC6 from the absence of the busy signal BUSY, a tuning data request command is transmitted to the printer 2 in step SC7. When reception of tuning data is confirmed in step SC8, the optimum waiting times W1 to W3 for transmission of the data signals DATA and strobe signal /STB are obtained on the basis of the tuning data in step SC9, and set in the RAM 13 as new transfer parameters in step SC10. Tuning control process is ended after execution of step SC10.

The computer 1 performs the printing data transmission operation after the optimum waiting times W1 to W3 are set in the RAM 13 through the tuning control process.

On the other hand, the tuning mode process is started upon reception of the above tuning mode command. When the tuning mode process is started, preparation of measurement of transition times is performed first in step SP1. In this preparation of measurement, the CPU 21 sets reference data "01010101" in the comparator 41A and clears the registers 43 to 46. These registers 43 to 46 are cleared immediately after the comparator 41A has received the data signals DATA corresponding to the transition test data "01010101" from the computer 1 in a state where the reference data "01010101" is held therein. Thereafter, the state transition time measuring circuit 29 performs measurement of the transition times of the data signals DATA and the strobe signal /STB. The data signals DATA change from "01010101" to "10101010", and then change from "10101010" to "01010101". Further the strobe signal /STB falls from "1" to "0" after the data signals DATA have changed from "01010101" to "10101010", and rises before the data signals DATA have changed from "10101010" to "01010101". As the results of measurement, the count values T1 to T4 are stored in the registers 43 to 46. The CPU 21 checks the registers 43 to 46 to read out the results of measurement in step SP2. When all the results of measurement are read out from the registers 43 to 46, completion of measurement is detected in step SP3. If the results of measurement are short, steps SP2 and SP3 are repeatedly executed. When reception of the tuning data request command is confirmed in step SP4 after completion of measurement, the results of measurement read from the registers 43 to 46 are sequentially supplied to the input and output unit 28 as tuning data and transmitted from the input and output unit 28 to the computer 1 in step SP5. The tuning mode process is ended after execution of step SP5.

After the tuning mode process, the printer 2 is restored to the normal mode wherein a printing operation is performed on the basis of printing data transmitted from the computer 1.

In the above-described step SC9, the optimum waiting times W1 to W3 are determined to satisfy the conditions on a data holding time DH, a data setup time DS, a max rate time MR, a strobe inactive time SA, and a strobe active time SA, which are represented by the following equations (1) to (5). In the equations (1) to (5), Tm, Tr, and Tp have specified values which are inherent primarily to the printer 2. Tm denotes a period of time required to compensates for an error produced because the actual value of T1 represents a difference between rise time and fall time of the data signals DATA. Tr denotes a period of receiving intervals determined by the maximum reception rate of the printer 2. Tp denotes a period of time required to detect the logic levels of the data signals DATA in the printer 2.

The data holding time DH represents a period of time during which the data signals DATA are held after fall of the strobe signal /STB, and must be set equal to or greater than Tm as follows:

$$DH = T4 - T2 - T1 + W1 + W3 \geq Tm \quad (1)$$

The data setup time DS represents a period of preparation time required for detecting the logic levels of the data signals DATA after completion of transition thereof, and must be set equal to or greater than Tm as follows:

$$DS = T2 - T1 + W2 \geq Tm \quad (2)$$

The max rate time MR represents a period of transmission intervals which maximizes the transmission rate of the data signals DATA, and must be set equal to or greater than Tr as follows:

$$MR = T4 - T1 + W1 + W2 + W3 \geq Tr \quad (3)$$

The strobe inactive time SI represents a period of time during which the strobe signal /STB is maintained inactive (high level), and must be set equal to or greater than Tr as follows:

$$SI = (T4 - T1) - (T3 - T2 + W3) + W1 + W2 \geq Tm \quad (4)$$

The strobe active time SA represents a period of time during which the strobe signal /STB should be maintained active (low level), and must be set equal to or greater than Tp as follows:

$$SA = T3 - T2 + W3 \geq Tp \quad (5)$$

The waiting time W1 is obtained from equation (1) as follows:

$$W1 = \max(Tm - T4 + T2 + T1 - W3, 0)$$

The waiting time T2 is obtained from equations (2), (3), and (4) as follows:

$$W2 = \max(\max(Tm - T2 + T1, 0),$$

$$\max(Tr - T4 + T1 - W1 - W3, 0),$$

$$\max(Tm - T4 + T1 + T3 - T2 + W3 - W1, 0))$$

The waiting time W3 is obtained from equation (5) as follows:

$$W3 = \max(Tp - T3 + T2, 0)$$

In the above equations, "max (X, Y)" means that the greater of values X and Y is selected.

As described above, in the computer system of this embodiment, the CPU 11, the CPU 21, and the state transition time measuring circuit 29 cooperate to transmit the data signals DATA and strobe signal /STB for transition test from the input and output unit 18 in the tuning mode, measure the transition times of the data signals DATA and strobe signal /STB for transition test, which are received by the input and output unit 28, and adjust the waiting times W1 to W3 on the basis of the results of measurement. These waiting times W1 to W3 are adjusted to optimize the transmission rate of the data signals DATA to be transmitted from the input and output unit 18 in accordance with printing data and the fall timing of the strobe signal /STB, which serves as a reference for a timing for detecting the logic levels of the data signals DATA, in a given operational environment. Therefore, logic level detection can always be performed immediately after completion of transition of the data signals without being influenced by the operational environment. Therefore, even when the input and output units 18 and 28 are connected through the cable 3 having a length larger than the standard length, a detection error can be prevented since the logic levels of the data signals are not detected during transition thereof. Further, even when the input and output units 18 and 28 are connected through a cable 3 having a length smaller than the standard length, waste of time can be prevented since the timing of logic level detection is not delayed with respect to completion of transition of the data signals.

Further, in the above embodiment, since the state transition time measuring circuit 29 measures the transition times without interrupting the operation of the CPU 21, the print control program for the CPU 21 is simplified.

The present invention is not limited to the embodiment described above, and various modifications can be made without departing from the spirit and scope of the present invention. For example, the aforementioned comparator 41A generates a start signal ST at a timing of detecting that any of the logic levels of data signals DATA is not equal to the that of a corresponding one of the reference data signals REF. If the data signals DATA are accidentally set equal to the reference data signals REF once after generation of the start signal ST, this start signal ST may be generated again, causing the counter 42 to be reset. At this time, incorrect values of T1 and T2 will be measured. Accordingly, the above-embodiment can be modified to independently measure T1 and T4 if there is a high possibility that that the counter 42 is reset unnecessarily.

Further, in the above embodiment, the waiting times W1 to W3 are obtained from equations (1) to (5). However, these equations can be modified in consideration of, e.g., other factors for making the signal waveforms dull and the arrangement of a circuit for detecting the logic levels of the data signals. In addition, the CPU 21 on the printer side can be modified to obtain the waiting times W1 to W3 instead of the CPU 11.

Moreover, in the above embodiment, only the busy signal BUSY is checked prior to transmission of the data signals DATA for transition test. However, the status data signals can be checked in addition to the busy signal BUSY in order to control the timing of transmission more appropriately.

What is claimed is:

1. A data transfer apparatus comprising:

a transmission unit for transmitting a data signal which is periodically updated;

a reception unit for receiving the data signal transmitted from said transmission unit and detecting a logic level of the data signal;

control means for controlling said transmission unit to transmit a transition test data signal in a tuning mode, measuring a transition time of the transition test data signal received by said reception unit, and adjusting on the basis of a result of measurement transfer parameters which define a transmission rate of data signal to be transmitted from said transmission unit and a logic level detection timing of the data signal;

said transmission unit including signal generation means for generating the data signal together with a strobe signal synchronized with the data signal; and said reception unit including signal detection means for detecting the logic level of the data signal in response to predetermined transition of the strobe signal from a first logic level to a second logic level.

2. An apparatus according to claim 1, wherein said control means includes measurement means for measuring the transition times of the data signal and the strobe signal, which are received in the tuning mode, and processing means for determining, on the basis of results of measurement, a first waiting time for causing the strobe signal to change from the first logic level toward the second logic level after update of the data signal, a second waiting time for causing the strobe signal to change from the second logic level toward the first logic level after the strobe signal has been changed to the second logic level, and a third waiting time for causing the data signal to update after the strobe signal has been changed to the first logic level.

3. An apparatus according to claim 2, wherein the first waiting time is determined such that the predetermined transition of the strobe signal is completed immediately after completion of transition of the data signal in said reception unit.

4. An apparatus according to claim 2, wherein said transmission unit is incorporated in a computer, said reception unit and said measurement means are incorporated in a peripheral device for said computer, and said processing means includes a second transmission unit which is incorporated in said peripheral device to transmit the results of measurement to said computer, a second reception unit which is incorporated in said computer to receive the results of measurement transmitted from said second transmission unit, a first processing circuit which is incorporated in said peripheral device to control an operation of said peripheral device and supply the results of measurement obtained from said measurement means to said second transmission unit, and a second processing circuit which is incorporated in said computer to control an operation of said computer, obtain the first to third waiting times on the basis of the results of measurement received by said second reception unit.

5. An apparatus according to claim 2, wherein said measurement means includes clock generation means for generating a reference clock, count means for counting a number of reference clocks generated by said clock generation means, memory means for storing a count value from said count means, and sequencer means for operating said count means at a timing of a start of transition of the data signal and sequentially setting count values obtained at timings of completion of transition of the data signal and the strobe signal in said memory means as the results of measurement.

6. An apparatus according to claim 5, wherein said sequencer means includes a comparator for detecting completion of the data signal by comparing the data signal with a reference signal, and an edge detector for detecting completion of transition of the strobe signal.

* * * * *

UNITED STATES PATENT AND TRADEMARK OFFICE
CERTIFICATE OF CORRECTION

PATENT NO. : 5,680,596
DATED : October 21, 1997
INVENTOR(S) : Iizuka, et al

It is certified that error appears in the above-identified patent and that said Letters Patent is hereby corrected as shown below:

On the title page,

Section [73] Assignees, please delete "International Business Machines Corporation, Kanagawa-Ken, Japan; Advanced Peripherals Technologies, Inc Armonk, N.Y." and insert therefor --Advanced Peripherals Technologies, Inc., Kanagawa-ken, Japan; International Business Machines Corporation, Armonk, N.Y.--.

At column 5, line 23, after "to" delete "the".

In column 6, line 18, the third occurrence of "the" should be deleted.

In column 7, line 19 delete "compensates" and insert therefor --compensate--.

UNITED STATES PATENT AND TRADEMARK OFFICE
CERTIFICATE OF CORRECTION

PATENT NO. : 5,680,596
DATED : October 21, 1997
INVENTOR(S) : Iizuka, et al

It is certified that error appears in the above-identified patent and that said Letters Patent is hereby corrected as shown below:

In column 8, line 50, after "to" delete "the".

In column 8, line 58, the second occurrence of "that" should be deleted.

Signed and Sealed this

Thirteenth Day of October 1998

Attest:

BRUCE LEHMAN

Attesting Officer

Commissioner of Patents and Trademarks